Feb. 21, 1967 L. M. HUBBY 3,304,766
METHOD FOR MEASURING TWO-PHASE FLUID FLOW
Filed Jan. 17, 1964 2 Sheets-Sheet 1
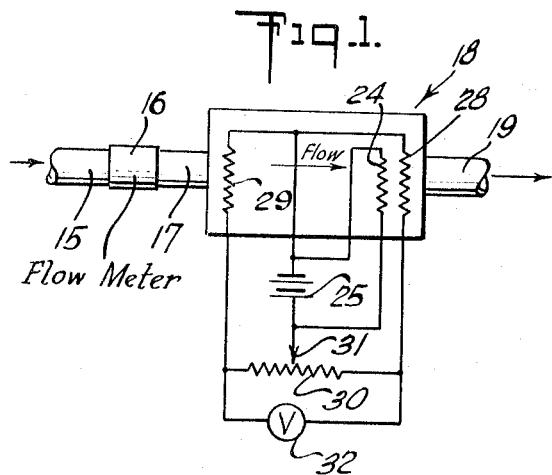
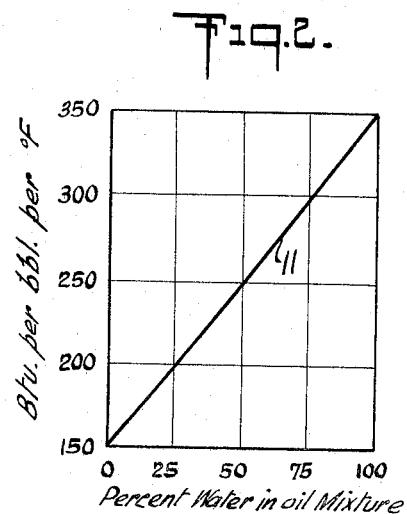
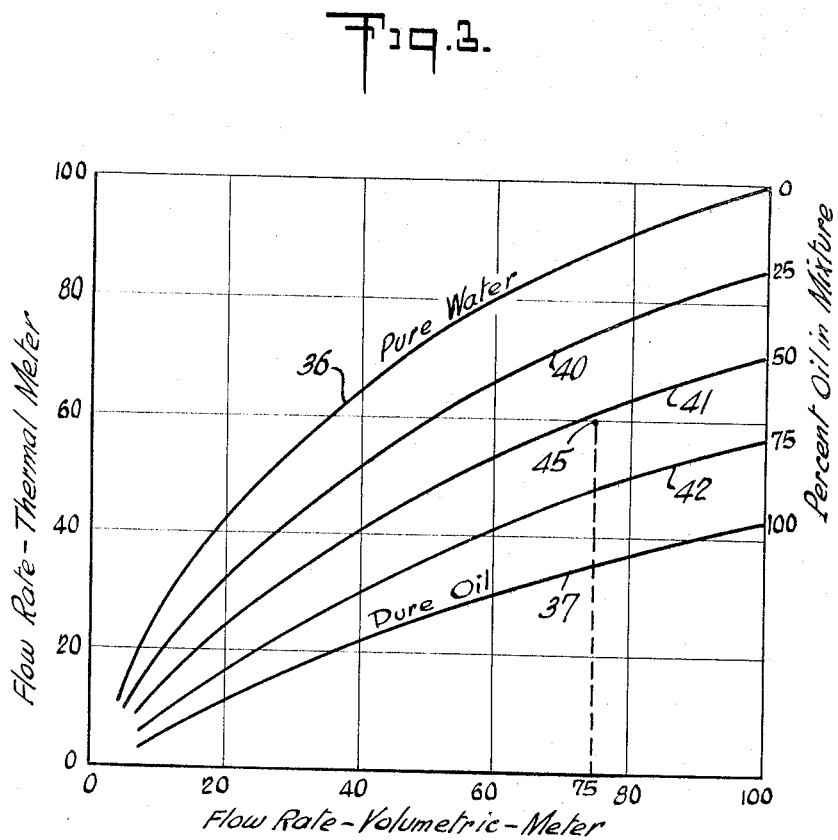

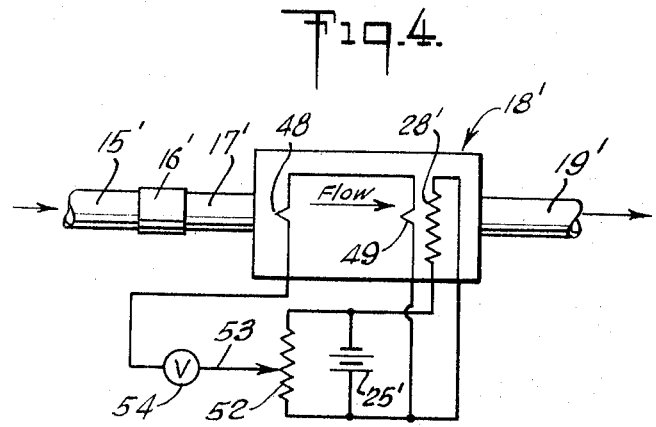
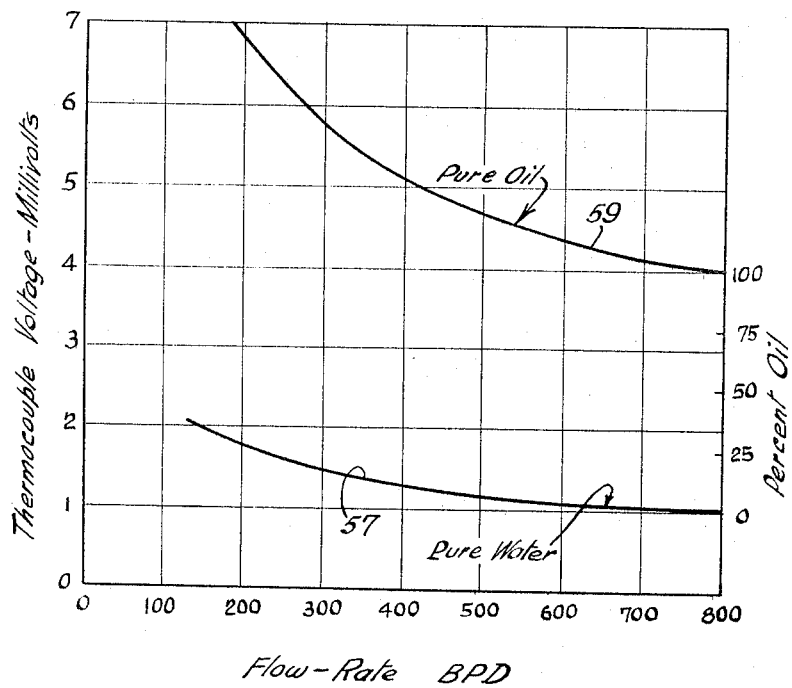

United States Patent Office 3,304,766
Patented Feb. 21, 1967

3,304,766
METHOD FOR MEASURING TWO-PHASE FLUID FLOW
Laurence M. Hubby, Bellaire, Tex., assignor to Texaco Inc., New York, N.Y., a corporation of Delaware
Filed Jan. 17, 1964, Ser. No. 338,500
3 Claims. (Cl. 73—61.1)

This invention is concerned with a fluid flow meter, in general. More specifically, the invention deals with a fluid meter capable of measuring the percentage of plural constituents of the fluid, without physically separating said constituents in order to make such measurement.

Heretofore, where a fluid having more than one constituent therein was to have the flow rate of a given constituent thereof measured without physically separating out such constituent, such measurement entailed the application of a correction factor to the readings of a volumetric type of flow rate meter in order to determine the flow rate of that constituent individually. That manner of making such a flow rate measurement has drawbacks, such as inaccuracies caused by extraneous effects, e.g., temperature changes.

On the other hand, this invention makes use of a characteristic of the constituents of a fluid which characteristic is sufficiently different in a relative sense between the constituents, and which is of such a nature that a flow rate measurement may be made based upon such characteristic. By comparing such a flow rate determination with the volumetric rate of flow of the fluid containing both constituents, a determination as to percentage of each constituent may be directly made with greatly improved accuracy.

Thus, it is an object of this invention to provide a plural phase flow meter for measuring fluid flow through a conduit where the percentage of the constituents of the fluid may be directly determined from the flow measurement, in accordance with the invention.

Another object of the invention is to provide for a two-phase fluid flow meter that is applicable to oil producing operations wherein it is desired to measure the fluid flow of a mixture containing oil and water, while at the same time determining the percentage of such phases (constituents) in the flowing fluid continuously. It will be appreciated that this is valuable for measurements either downhole during production of fluids containing both oil and water, as well as at the surface in other production fluid handling operations.

Another object of the invention is to provide a two-phase fluid flow meter based on thermal capacity of the constituents of a fluid being measured, so that the percentage of each constituent may be directly determined.

Briefly, the invention concerns a plural phase, fluid flow meter for measuring fluid flow through a conduit. Such meter comprises in combination means for measuring total volume flow rate of said fluid through said conduit. Such meter also comprises flow rate measuring means of the fluid in said conduit which is dependent upon a characteristic of said fluid phases and which characteristic is different for each phase, relative to one another. Results of the foregoing combination may be applied so that the percentage of each phase in the total flow may be directly determined.

Again briefly, the invention may be described as a method of simultaneously measuring rate of flow of separate constituents of a fluid wherein said constituents have a measurable characteristic that is substantially different for each constituent relative to one another. The method comprises measuring the rate of flow of the volume of said fluid containing all of said constituents, and measuring the rate of flow of said fluid based upon said characteristic. It also comprises determining the percentage of one of said constituents in the total fluid by comparing said measured flow rates.

Once more briefly, the invention relates to a two-phase fluid flow meter that comprises in combination a means for measuring volumetric rate of flow of said fluid, and a means for measuring flow rate based upon thermal capacity of said unseparated fluid. The said fluid being a mixture of oil and water. A result of the combination is that the percentage of said oil and water phases in the total fluid flow may be determined.

The foregoing and other objects and benefits of the invention will be more fully set forth below in connection with the best mode contemplated by the inventor of carrying out the invention, and in connection with which there are illustrations provided in the drawings, wherein:

FIGURE 1 is a schematic diagram illustrating the elements of the invention;

FIGURE 2 is a graph illustrating the relationship of the thermal capacity characteristics for water and oil;

FIGURE 3 is a set of curves illustrating the relationship between flow rate as measured by a thermal meter, and flow rate as measured by a volumetric meter so as to determine the percentage of the oil and water constituents of the measured fluid flow;

FIGURE 4 is a schematic diagram similar to FIGURE 1, illustrating a modification of the invention; and FIGURE 5 is a graph with curves illustrating the relationship of values which may be obtained from apparatus in accordance with the FIGURE 4 modification.

In petroleum production operations, and particularly in producing crude oil from a well, it is desirable to determine continuously the amount or volume of any water that is included as a constituent of the fluid being produced. Heretofore, although a determination of the volume of oil and water, in a mixture has been made without physically separating the water and oil phases of the mixture, there was room for improvement of the accuracy of the results.

This invention makes use of the fact that water and oil have substantially different thermal capacities. For example, it may be noted that the thermal capacity of oil is about 150 B.t.u.'s per barrel per degree Fahrenheit while the thermal capacity for water is 350 B.t.u.'s per barrel per degree Fahrenheit. This relationship is illustrated in FIGURE 2 where the ordinate of the graph illustrated is calibrated from 150 to 350 B.t.u.'s per barrel per degree Fahrenheit, while the abscissa is calibrated from zero to 100 in percent of water in an oil-water mixture. Thus, the mixture of a fluid having different percentages of oil and water follows the relationship illustrated by the straight line curve 11 of FIGURE 2, depending upon the percentage of water in the mixture.

Referring to FIGURE 1 it is pointed out that there is a pipe or conduit 15 through which the fluid to be measured is flowing. The pipe 15 connects to a volumetric type flow meter 16 through which all of the fluid in pipe 15 will flow. Meter 16 may be any of a number of different standard types of flow meters, e.g., a turbine type meter, which measure the flow of fluid as based upon the volume of such fluid. This type of meter is not affected by such characteristics of the fluid as the relative amount of any constituents thereof, but merely the physical volume. The other side of flow meter 16 is connected via another conduit 17 to a thermal type of rate-of-flow meter 18. The output of the thermal meter 18 is connected to a conduit 19.

Flow rate meter 18 may take various physical forms, but it is schematically illustrated showing the basic elements involved in the particular embodiment being described. Thus, there is employed a heating element 24 that is connected directly across a power source, e.g., a battery 25 illustrated. The heating element 24 is located physically adjacent to a temperature sensitive resistance element 28. It will be understood that the electrical resistance of this resistor 28 will vary in accordance with the temperature thereof. Resistor 28 is connected as one leg of an electrical bridge circuit, with another temperature responsive resistor 29 connected as an adjacent leg in the bridge circuit. Resistor 29 is immersed in the same flowing fluid as is resistor 28 and its adjacent heating element 24. A resistor 30 has a slide contactor 31 associated therewith for sliding contact therealong. It (resistor 30) is connected into the circuit including resistors 28 and 29, so as to have the two portions of the resistor 30 acting as the remaining two legs of the bridge circuit. There is a volt meter 32 that is connected across one pair of diagonal points on the bridge circuit, so as to determine when the bridge is in balance.

It will be appreciated that in operation, the thermal rate of flow meter 18 provides a response that is indicative of the combined effects of the flow rate, and the thermal capacity of the fluid flowing. In operating the meter 18, it may be balanced (zero voltage output at volt meter 32) under low flow conditions, e.g., about twenty percent of maximum system capacity, since zero flow conditions are unstable. A reading of the position of slider contact 31 will then be the reading based on thermal characteristics for a predetermined volumetric flow rate. By employing known mixtures of water and oil, e.g., pure oil and pure water, the readings of the thermal rate meter may be calibrated. As increasing rates of flow of fluid through the meter take place, there will be a change in the heat transfer effect between the resistor 28 and the heating element 24, dependent upon the rate of flow of the fluid in addition to the thermal capacity thereof. Readings for this flow rate will be taken from the position of contactor 31 when the bridge circuit is balanced for any given flow condition. Such readings may be calibrated from low flow rate to a maximum flow rate for the thermal meter.

It will be observed that temperature compensation is obtained by reason of the fact that both resistor 29 and resistor 28, that are adjacent legs of the bridge circuit, are immersed in the flowing fluid and subject to the same ambient temperature of such fluid so that the bridge is equally effected on both sides thereof in a cancelling manner, i.e., the balance of the bridge remains unchanged. Similarly, where a thermocouple type thermal meter is employed, e.g., a system like that of FIGURE 4; any changes in ambient temperature will be compensated for because both the hot and cold junctions are immersed in the fluid and will be affected equally, in what is in effect a cancelling manner.

The details of the structure for thermal flow meter 18 form no part, per se, of this invention and one type of thermal flow meter which might be employed is that manufactured by The Anemostat Corporation of America, New York, N.Y. That company has a gas flow meter entitled "Anemotherm Gas Flow Meter" that is described in its Bulletin No. 5100.

FIGURE 4 illustrates a modified form of apparatus for carrying out the invention. It is to be noted that the basic combination is the same as the elements illustrated in FIGURE 1 and consequently, the similar elements which remain unchanged have corresponding reference numerals applied thereto in FIGURE 4, with the addition of a prime mark thereto. Thus, the FIGURE 4 combination includes a volumetric type flow meter 16' in series with a thermal type of flow meter 18'. However, in this modification the thermal meter 18' employs thermocouple elements for heat loss determinations. Therefore, there is illustrated a cold junction 48 in series with a hot junction 49 which together make up a thermocouple that provides an E.M.F. at the output thereof whenever the temperature is different at the two junctions 48 and 49. There is a heater resistance element 28' located adjacent to and downstream from the hot junction 49 of the thermocouple. It will be understood that these relative positions could be reversed, or that the heater element and hot junction could be spaced apart at substantially the same location relative to the stream flow. Heater element 28' is connected across a source of power, e.g., battery 25'. The amount of transfer heat from the resistance element 28' to the hot junction 49 depends upon the thermal capacity of the fluid flowing past these two elements as well as the rate of the flow thereof. There is a potentiometer 52 connected across the battery 25'. The potentiometer has a slider 53 to determine the E.M.F. of the output from the potentiometer. Slider 53 is connected to one side of a volt meter 54 (or other indicating and/or recording element). The other side of the volt meter 54 is connected to one output from the thermocouple, i.e., to one side of cold junction 48. The other output of the thermocouple, i.e., one side of hot junction 49, is connected (as illustrated) to one side of the battery 25' which supplies the potentiometer 52.

It will be appreciated that the operation of the FIGURE 4 modification may be carried out such that the output indication, i.e., volt meter 54, is set to zero under low flow conditions. In other words, when the fluid in thermal meter 18' is flowing as slowly as is feasible under stable conditions (about twenty percent of maximum flow) there will be maximum transfer of heat from the heating element 28' to hot junction 49 and consequently, there will be a maximum difference of temperature between junction 49 and junction 48 of the thermocouple, so that the E.M.F. output generated will be maximum. Under these conditions, the slider 53 is adjusted until the voltage output of the potentiometer 52 is equal and opposite to the E.M.F. generated by the thermocouple and this is indicated by a zero reading of volt meter 54. Then, whenever there is increased flow of the fluid through meter 18' there will be less heat transferred from heater element 28' to the hot junction 49 and consequently, the E.M.F. generated by the thermocouple will be reduced. This means that there will be a difference between the thermocouple output voltage and the potentiometer voltage (as previously adjusted) which difference will be indicated by the volt meter 54. The reading or output signal of volt meter 54 thus obtained, may be calibrated from low to maximum flow in the same manner as in general applied with respect to the FIGURE 1 modification.

It will be understood, of course, that particular structure for the elements of either the FIGURE 4 or the FIGURE 1 modification may vary considerably. Consequently, no attempt is made to limit this disclosure in such respect. For example, a structural arrangement (not shown) of the FIGURE 4 circuit elements that is particularly adapted for use in a pipe, through which fluid is flowing, may employ a number of hot junction thermocouple elements arranged in radially extending flattened tubes, plus a corresponding number of cold junction elements located spaced some distance longitudinally upstream.

FIGURE 3 illustrates graphically the manner in which results from measuring fluid flow by both the volumetric flow meter 16 and the thermal flow meter 18 may be combined, in order to determine the amount of each of the two phases or constituents of the fluid that is in the combined fluid flowing. Thus, in the example being described, the fluid flow under measurement is a mixture of water and oil, so that the two phases of the total fluid are water and oil. In order to determine the percentage of oil or water in the mixture at any given rate of flow it is only necessary to plot curves showing the flow rates, over the full range of indication of the meters, in the manner illustrated by FIGURE 3. Thus, a curve 36 shows the relationship of flow rate indications given by the thermal meter 18 to the flow rate indications of the volumetric meter 16, where the fluid is pure water. Similarly, the flow rate as indicated by the thermal meter 18 (on a percentage basis) will vary in accordance with a curve 37 in relation to the flow on a volumetric basis (meter 16) where the fluid flowing is pure oil. Also, intermediate calibration curves may be plotted at known percentage mixtures of the fluid, e.g., a curve 40 at twenty-five percent oil in the mixture and similarly curves 41 and 42 at fifty percent and seventy-five percent oil in the mixtures, respectively. Following such calibration for the readings of the two flow meters involved, under known conditions, a direct determination indicating the percentage of one constituent in an unknown mixture of fluid may be determined by reading both the volumetric flow rate and at the same time noting the reading of the thermal type flow rate. These readings will determine a point falling between curves 36 and 37 of the FIGURE 3 graph. This point may be taken, by interpolation between the calibration curves, to indicate directly the percent of oil in the mixture. For example, if the flow rate reading from volumetric meter 16 is seventy-five percent, and at the same time the flow rate reading from thermal meter 18 is sixty percent of its full range, a point 45 on the graph illustrated in FIGURE 3 is determined. Furthermore this point may be found by interpolation to lie at a reading of fifty-three percent, which is the percentage of oil in the mixture.

FIGURE 5 illustrates graphically how the results from apparatus according to the FIGURE 4 modification, may be employed. Thus, by plotting flow rate against thermocouple voltage the percent of oil in a mixture may be determined by calibrating the thermocouple readings at known mixtures. For example, a curve 57 shows the relationship for pure water, while a curve 59 shows the same relationship for pure oil. Of course, additional calibration curves may be added if desired, as indicated by the scale on the right hand side of the graph captioned "Percent Oil." It will be noted that the scale on the left hand side of the graph is in terms of thermocouple voltage in millivolts, while the scale along the bottom of the graph is in terms of flow rate in barrels per day (BPD).

A plural phase flow meter according to the invention is particularly well adapted for use in downhole fluid flow measurements in oil well production. However, it will be appreciated that such a meter may be also very useful in surface fluid flow measurements where it is desired to directly determine a percentage of oil in water or vice versa in a fluid that is a mixture thereof. This is particularly useful where the fluid mixture may be varying in time.

It will be appreciated that the subject invention provides a method which does not rely on any specific apparatus for carrying out the method. Thus, among the steps involved in carrying out this invention (but not necessarily in this order) are the following. Step one, measuring the rate of flow by volume of a fluid which contains the plural constituents having different characteristics from one another. Step two, measuring the rate of flow of the fluid measured in step one, which measurement is based upon a characteristic of said fluid constituents that is different from one another sufficiently to provide adequate determination of difference between such constituents. Step three, determining from the measurements taken in steps one and two, the percentage of one of the constituents of the total fluid flowing. It will be appreciated that the foregoing steps of a method according to this invention may be carried out with a wide variety of different physical structures as well as by hand under certain circumstances.

While a particular embodiment of the invention has been described above in considerable detail in accordance with the applicable statutes, this is not to be taken as in any way limiting the invention but merely as being descriptive thereof.

I claim:

1. A method of simultaneously measuring rate of flow of the oil and water constituents of a fluid mixture, comprising measuring the rate of flow by volume of said mixture, measuring the rate of flow by thermal capacity of said mixture, and determining the percentage of oil in the total fluid by comparing said two measured flow rates with respect to predetermined compared values for known percentages of said constituents.

2. A method of simultaneously measuring rate of flow of the constituents of a plural constituent fluid mixture, comprising measuring the rate of flow by volume of said mixture, measuring the rate of flow by thermal capacity of said mixture, and determining the percentage of constituents in the total fluid by comparing said two measured flow rates with respect to predetermined compared values for known percentages of said constituents.

3. A method of simultaneously measuring rate of flow of the phases of a two-phase fluid flowing in a stream, comprising the steps of measuring the rate of flow by volume of said fluid stream, applying heat exchange at a predetermined location in said stream, measuring temperature difference at two points spaced apart along said stream, one of said points being adjacent to said heat exchange location, and determining the percentage of said phases by comparing said temperature measurements with said measurement of the rate of flow by volume with respect to predetermined compared values for known percentages of said phases.

References Cited by the Examiner

UNITED STATES PATENTS

| | | | |
|---|---|---|---|
| 2,799,165 | 7/1957 | Varvel | 73—204 |
| 2,983,145 | 5/1961 | Horn et al. | 73—193 |
| 3,014,362 | 12/1961 | True et al. | 73—53 |
| 3,020,760 | 2/1962 | Schnall | 73—204 |

RICHARD C. QUEISSER, *Primary Examiner.*

J. W. MYRACLE, *Assistant Examiner.*